March 17, 1970  J. M. VAN ECK  3,500,830
INJECTION SYRINGE

Filed July 19, 1967  2 Sheets-Sheet 1

INVENTOR.
JOHANNES M.V. ECK

BY
*Frank R Infari*
AGENT

United States Patent Office 3,500,830
Patented Mar. 17, 1970

3,500,830
INJECTION SYRINGE
Johannes Marie van Eck, Leeuwarden, Netherlands, assignor, by mesne assignments, to U.S. Philips Corporation, New York, N.Y., a corporation of Delaware
Filed July 19, 1967, Ser. No. 654,509
Claims priority, application Netherlands, Aug. 10, 1966, 6611226
Int. Cl. A61m 5/24
U.S. Cl. 128—218     5 Claims

ABSTRACT OF THE DISCLOSURE

An injection syringe having a protective cap screw threaded on the syringe body over the injection needle. The unscrewing of this cap will by means of an oppositely threaded screw connection, axially displace the injection needle toward the reservoir such that the end of the needle can puncture the reservoir wall.

---

This invention relates to injection syringes, in particular to a syringe in which the injection needle punctures the reservoir and is made ready for use simultaneously with the removal of the protective cap.

In prior art injection syringes, the compressible reservoir constituted the syringe body, and the puncturable wall part thereof was surrounded by a screwthread which, in co-action with a matching internal screwthread present in a cavity of the needle holder, formed the movable connection of that holder with the reservoir. The side of the needle holder opposite the said cavity has a threaded projection. This projection formed, in co-action with the internal screwthread of the protective cap, the detachable connection between cap and needle holder. The hollow injection needle fixed in the holder was provided with a sharp peak at either end. The end of the needle situated in the cavity of the needle holder punctured the wall part of the reservoir when the needle holder was screwed onto the reservoir. The syringe was made ready for use by then screwing the protection cap off the needle holder. This known injection syringe is thrown away after having been used once.

Formerly, the use of clamping slide connections between cap, needle holder and reservoir was a common construction for such syringes; this however presented a risk of leakage, untimely mutual shifts of the relevant parts of the syringe, and also because clamping action of these connections, difficulty in operation of the syringe. The screw connections as used in the known injection syringes described have these advantages to a lesser degree. The use of a right and left-hand screwthread for the injection syringe has the advantage of eliminating the possibility of unscrewing the needle holder during the removal of the protective cap, to the contrary, the needle holder will be pressed more tightly onto the reservoir during removal of the cap.

With the known injection syringes, it is necessary for at least the connection between needle holder and reservoir, and preferably also between the protective cap and needle holder, to be locked when the syringe is not in use. This is usually accomplished by specially provided means such as self-adhesive tapes, locking pins, etc. In addition, after unlocking, two screwing movements—preferably in a certain order: first holder and then cap—must be carried out successively before the injection syringe is ready for use. The operation of the syringe is therefore not essentially simpler than that of former products used for similar purposes.

The object of the invention is to overcome at least in part the described disadvantages. To this end an injection syringe according to the invention is characterized in that the screwed connections of the needle holder and the protective cap coact to axially displace the needle toward the reservoir during removal of the protective cap from the syringe body.

In the injection syringe according to the invention the advantages of screwed connections are retained, additionally the operation of the syringe is simplified considerably. When the protective cap is screwed off, the needle holder is taken along in the direction of rotation of the cap, but the holder slides in a direction opposite the axial movement of the cap and hence towards the reservoir. According to the invention, the components of the syringe are preferably proportioned and formed so that, with the protective cap removed, the puncturable wall of the reservoir is punctured by the needle. In that way the syringe is automatically brought into operative condition by removing the cap.

In addition the injection syringe according to the invention requires substantially no or only a very simple additional locking of the movable parts, when the syringe is not in use. This is accomplished by providing that at least one of the parts formed by needle holder and protective cap will be pushed against a stop in its final position and preferably both parts at the same time. Because of the opposite direction of the screwthread with which holder and cap are connected to the syringe body in that condition, these screwed connections have a strong self-locking effect.

An advantageous embodiment of the injection syringe according to the invention is characterized in that part of the needle holder which is movable in the cap, and the bore of the cap have cross-sections with one or more straight sides. As a result the movability of the needle holder in the protective cap during rotation of the cap, is achieved with structurally simple means.

The opposite axial movement of holder and cap with respect to the syringe body can be utilized in another embodiment of the injection syringe according to the invention to fix the injection needle tightly with respect to the housing in the final position associated with the operating condition of the syringe. This embodiment according to the invention is characterised in that the needle is provided with a flange which, with the cap removed, is clamped between the holder and the body which then have approached each other. A similar result can be achieved with an alternative embodiment of the syringe according to the invention which is characterised in that a surface part of the needle holder adjacent to the wall of the reservoir engages the body when the cap is removed.

In order that the invention may be readily carried into effect it will now be described in detail, by way of example, with reference to the accompanying diagrammatic drawing, in which.

For the sake of clarity the injection liquid is not shown in the figures.

Figure 1:
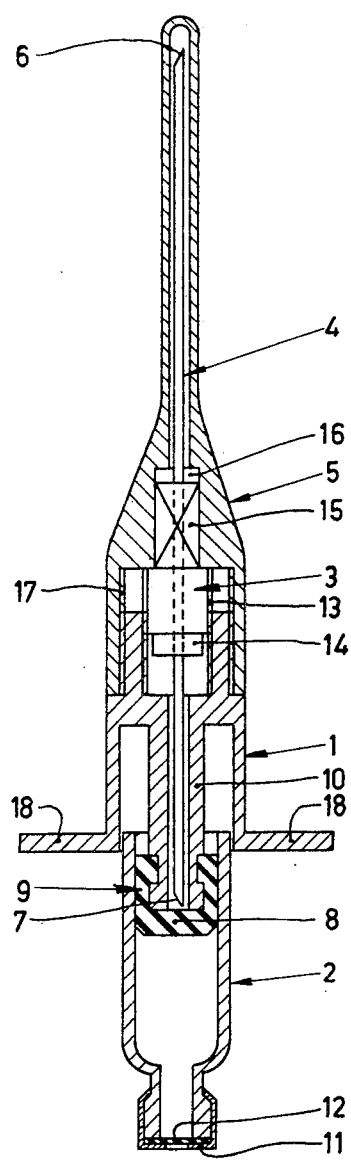
FIGURE 1 shows a longitudinal section of one embodiment of an injection syringe according to the invention in closed condition.
Figure 2:
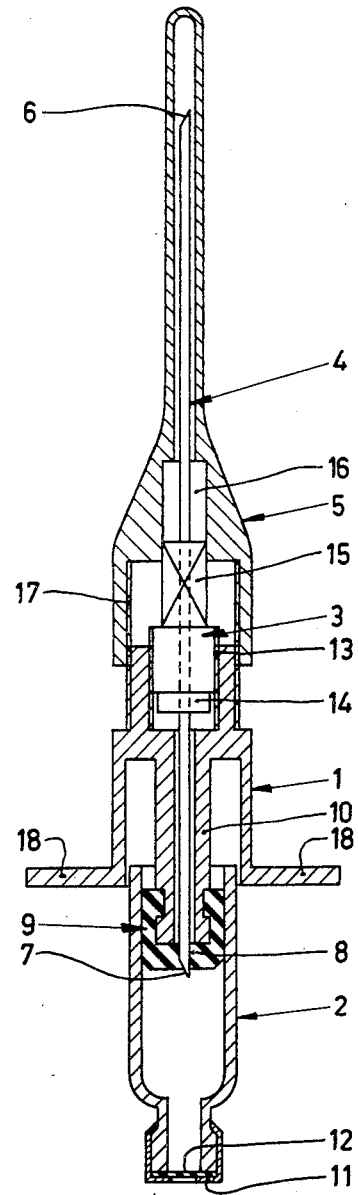
FIGURE 2 shows also a longitudinal section of the syringe of FIG. 1, in a condition in which the protective cap has been unscrewed over some distance—but is still held in position on the syringe body—and as a result the injection needle has already punctured in part the puncturable wall part of the reservoir.

The injection syringe shown FIGURES 1 and 2 comprises a syringe body or housing 1 with reservoir 2, a needle holder 3 with injection needle 4 and a protective cap 5. The needle 4 has two sharp ends 6 and 7, the end 7 being located opposite the puncturable wall part 8 of the reservoir in the inoperative condition shown in FIGURE 1. This wall part 8 is actually a part of the piston 9 consisting of a suitable puncturable material—such as rubber—and is fixed to the end of the hollow piston rod 10 which forms part of the syringe body 1 and through which the needle end 7 passes. In the embodiment of the syringe as shown in FIGURES 1 and 2 the reservoir 2 comprises a second, puncturable wall part 12 fixed to the flanged cap 11 which can be used for other purposes. The needle holder 3 is movably connected to the syringe body 1 by means of screwthread 13. In the embodiment of the injection syringe according to the invention shown in FIGURES 1 and 2, the needle 4 is not rigidly fixed to the holder 3, but can slide therein to some extent. The needle 4 comprises, however, a flange 14, so that the needle is taken along by the holder 3 as this holder is moved towards the reservoir. The holder 3 also has a projection 15 of square cross-section (indicated by a cross in the elevational view of the projection), which slidingly fits in the cavity 16, also having a square cross-section, of protective cap 5. By means of its screwthread 17, cap 5 is detachable from the syringe body 1. The cap 5 has a left-hand screwthread 17 and the holder 3 has a right-hand screwthread 13.

When the syringe is ready for use, the cap 5 is screwed off the syringe body 1. The needle holder 3 will rotate in the direction of rotation of the cap because the walls of the cavity 16 in the cap engage the projection 15. The needle holder 3 will also rotate in screw threads 13 and will move the needle 4 by way of the attached flange 14 in an axial direction opposite to that of the cap 5 because of the opposite screw threads 13 and 17. As is shown in FIGURE 2, the puncturable wall 8 is then punctured by the sharp end 7 of the needle. The above-described components of the syringe are proportioned so that, with the protective cap 5 fully removed, the wall part 8 is entirely punctured by the needle 4 and also the flange 14 is clamped in position between holder 3 and syringe body 1.

When the syringe is filled, the user can let the injection liquid in reservoir 2 pass out through the needle 4 by pushing the reservoir 2, which during this action moves over the piston 9, towards the syringe body 1. He can then use the projections 18 of the syringe body 1 as handles.

Figure 3:
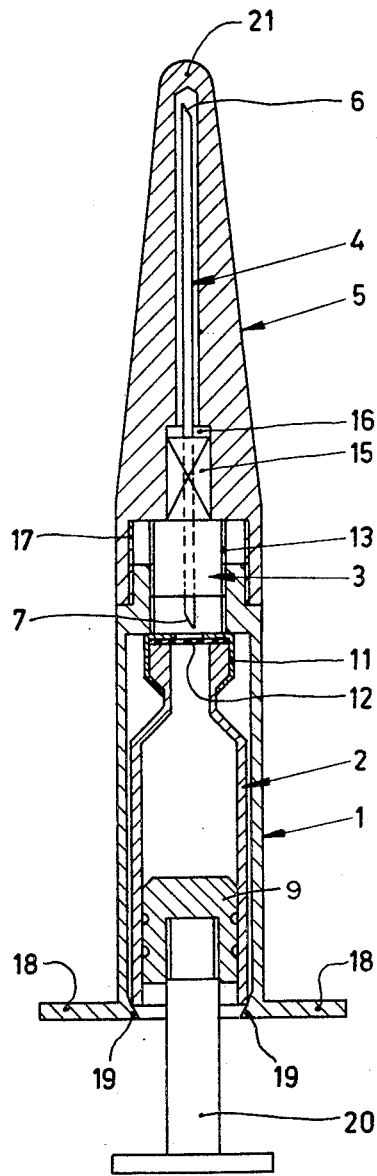
FIGURE 3 shows also in longitudinal section another embodiment of an injection syringe according to the invention, in closed condition.

The other embodiment of the injection syringe according to the invention and shown in FIGURE 3 also comprises a syringe body 1 with handles 18 and reservoir 2, a holder 3 provided with a screw-thread 13 and a projection 15 of square cross section, and including an injection needle 4 with two sharp ends 6 and 7, and a protective cap 5 having the screwthread 17 and the cavity 16 of square cross-section. In this syringe, however, the needle 4 is rigidly fixed in the holder 3 (by means not shown further, e.g. by soldering) and the reservoir with its puncturable wall 12 fixed by a flanged cap 11 is fully incorporated in the syringe body 1 and locked in it by means of the shoulder 19. The operation of this syringe is analogous to that shown in FIGURES 1 and 2, on the understanding that when the syringe is taken into use the end 7 of the needle punctures the puncturable wall 12 and the piston 9 is moved towards the needle 4 by means of a separate piston rod 20 within the reservoir 2 now anchored in the syringe body 1. Furthermore, the components of the syringe of FIGURE 2 are matched to one another so that the surface part of the needle holder 3 adjacent to the reservoir engages the syringe body 1 when the cap is removed.

Instead of piston rod 20, a part of the cap 5 provided for example at its end 21 with a suitable screwthread connection could also serve as a piston rod.

It will be evident that numerous embodiments of the injection syringe according to the invention are possible other than the two shown in the drawing.

What is claimed is:

1. An injection syringe comprising a housing, said housing defining therein an externally threaded portion and an internally threaded portion, said portions being coaxially situated, a protective cap engaging the externally threaded portion of the housing, a double-ended injection needle mounted within the housing, a needle holder surrounding said needle and engaging the internally threaded portion of the housing, said internally threaded portion being oppositely directed from said externally threaded portion, means for engaging the needle holder in the protective cap so that the holder will rotate with the cap and displace the needle, a reservoir having a puncturable wall attached to the housing and so spaced from one of the ends of the needle that during the rotational removal of the protective cap the needle will contact the reservoir and puncture the wall.

2. An injection syringe as claimed in claim 1 wherein the means for engaging the needle holder and protective cap comprises a projection on the needle holder with one or more straight sides, and a cavity defined in the cap for slidably accommodating the projection.

3. An injection syringe as claimed in claim 2 further including a piston means coacting with the reservoir for removing the injection liquid through the needle.

4. An injection syringe as claimed in claim 3 wherein the injection needle is slidably mounted within housing and further includes a flange affixed to the needle and positioned between the needle holder and housing, which flange is slidably displaced by the needle holder during rotation of the cap.

5. An injection syringe as claimed in claim 3 wherein the injection needle is rigidly mounted to the needle holder and displaced during rotation of the cap.

References Cited

UNITED STATES PATENTS

| 2,483,825 | 10/1949 | Goldberg. |
| 2,720,880 | 10/1952 | Whitaker et al. |
| 2,828,742 | 4/1958 | Ashkenaz. |
| 3,378,008 | 4/1968 | Ogle _____ 128—220 |

FOREIGN PATENTS 989,185  4/1965  Great Britain.

RICHARD A. GAUDET, Primary Examiner

M. F. MAJESTIC, Assistant Examiner

PO-1050
(5/69)

UNITED STATES PATENT OFFICE
CERTIFICATE OF CORRECTION

Patent No. 3,500,830          Dated    March 17, 1970

Inventor(s)  JOHANNES MARIE VAN ECK

It is certified that error appears in the above-identified patent and that said Letters Patent are hereby corrected as shown below:

Column 1, line 52 "advantages" should have been --disadvantages--

Signed and sealed this 11th day of August 1970.

(SEAL)
Attest:

Edward M. Fletcher, Jr.
Attesting Officer

WILLIAM E. SCHUYLER, JR.
Commissioner of Patents